United States Patent
Herz

[11] 3,829,766
[45] Aug. 13, 1974

[54] ELECTROCARDIOGRAM MONITORING APPARATUS

[75] Inventor: Rudolf Herz, Denzlingen, Germany

[73] Assignee: Fritz Hellige, & Co., G.m.b.H., Breisgau, Germany

[22] Filed: Apr. 2, 1973

[21] Appl. No.: 346,913

[30] Foreign Application Priority Data
Apr. 11, 1972   Germany............................ 2217235

[52] U.S. Cl........................... 324/77 R, 128/2.06 A
[51] Int. Cl............................................. G01r 23/16
[58] Field of Search.. 324/77 R; 128/2.06 R, 2.06 A

[56] References Cited
UNITED STATES PATENTS

| | | | |
|---|---|---|---|
| 3,267,933 | 8/1966 | Mills et al....................... | 128/2.06 A |
| 3,658,055 | 4/1972 | Abe et al........................ | 128/2.06 A |
| 3,698,386 | 10/1972 | Fried.............................. | 128/2.06 A |

Primary Examiner—Alfred E. Smith
Attorney, Agent, or Firm—Robert M. Vargo; Alan C. Rose; Alfred B. Levine

[57] ABSTRACT

A monitoring apparatus is disclosed for automatically analyzing electrocardiograms in order to detect myocardial infarction. The apparatus for observing heart rhythm disturbances comprises a logic system which establishes a sequence of timed windows occurring during scanned heartbeat intervals. The logic system further electrically records and stores the windows in which electrocardiogram threshold levels occur over several regular heartbeat intervals to provide a normal, reference pattern. After which, the logic system electronically determines the window or windows in which the threshold levels occur in subsequent heartbeat cycles. A compare logic system is then provided to compare the determined window or windows with the normal, reference pattern. Finally, an alarm system is provided that is responsive to any variations or non-identities of the compared patterns.

9 Claims, 6 Drawing Figures

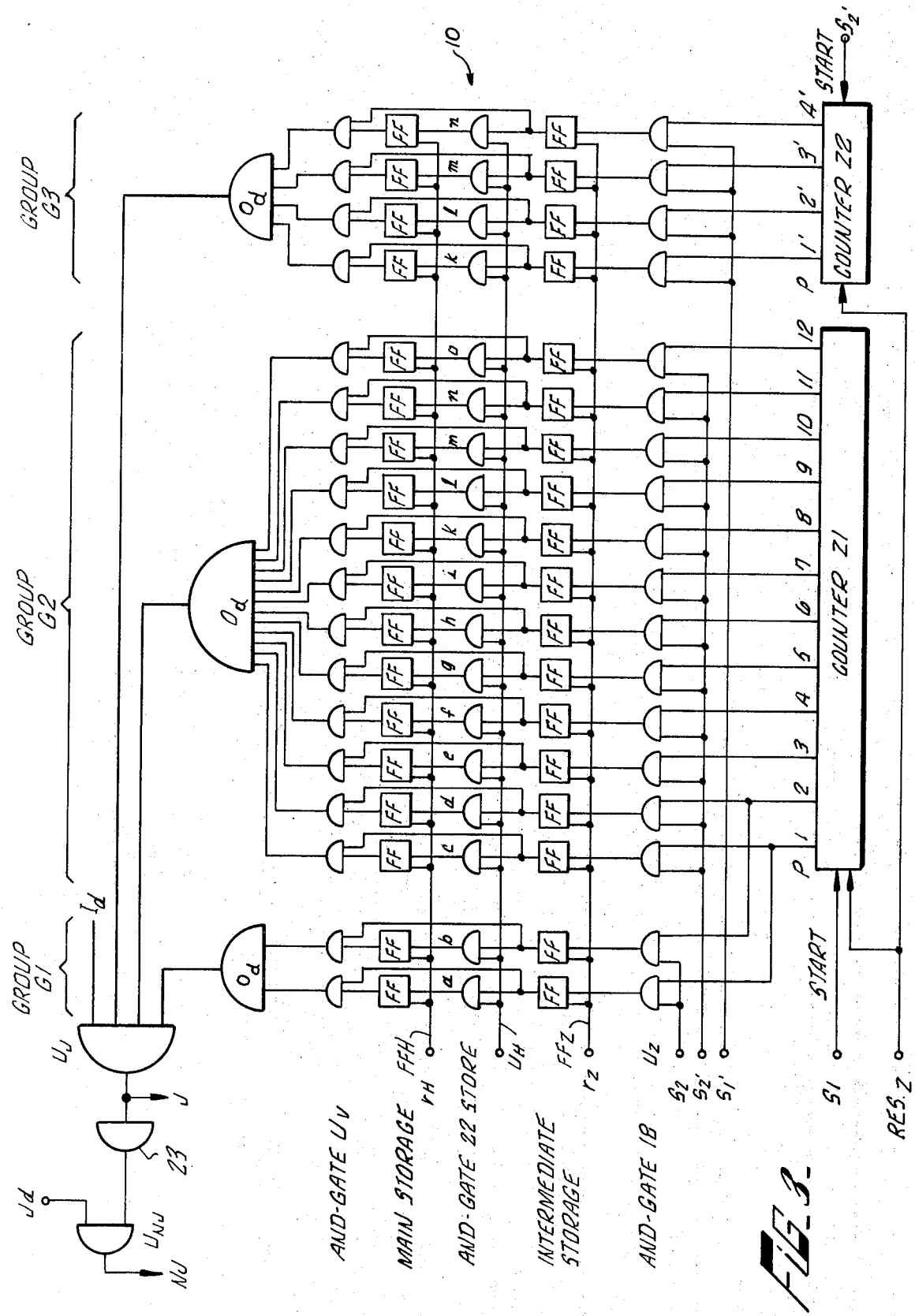

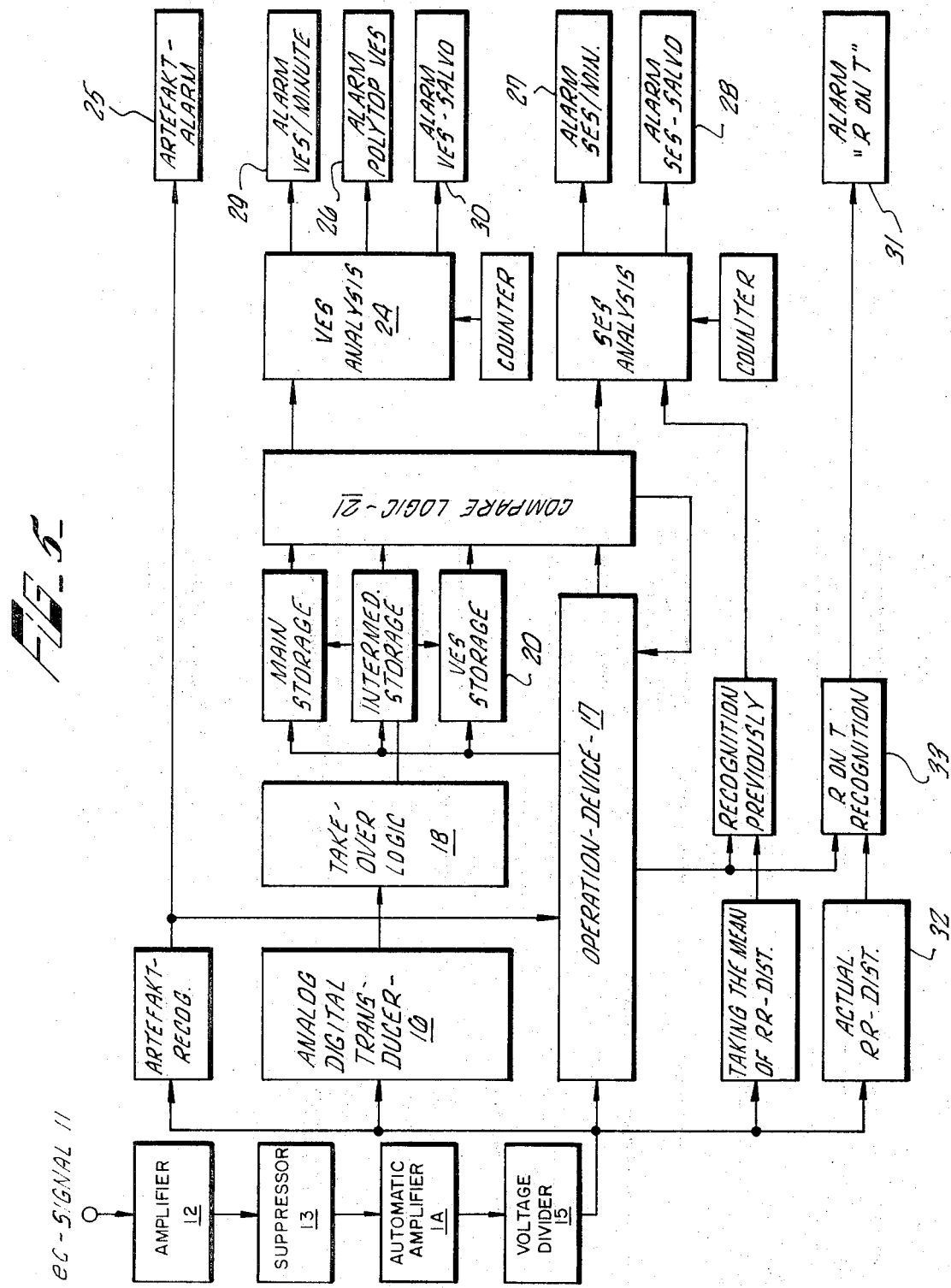

3,829,766

ELECTROCARDIOGRAM MONITORING APPARATUS

BACKGROUND OF THE INVENTION

1. Field of the Invention

The present invention relates generally to heart monitoring equipment and more particularly to monitoring equipment for detecting abnormal variations in an electrocardiogram.

2. Description of the Prior Art

Recent studies have indicated that after a myocardial infarct of a patient, the onset of serious arrhythmias such as ventricular tachycardia, flutter or fibrillations are almost always preceded by abnormal variations in the electrocardiogram (hereinafter referred to as "ecg"). A recognition of these variations, therefore, is important to prevent such dangerous arrhythmias by remedial treatment.

The variations that announce the onset of serious arrhythmias mentioned above, are particular QRS-portions or ventrical portions that appear earlier than the normal heartbeats and differ in shape from the basic cardiac cycle. These stimulations are named after their regional source in the atrium or ventricle of the heart as supraventricular or ventricular extrasystoles (hereinafter referred to as "SES" or "VES," respectively).

The probability of an onset of dangerous arrhythmias of the heart differs with the type and number of extrasystoles and also differs with the time distance from the prior stimulation. Normally, the probability of occurence of ventricular tachycardia, flutter or fibrillation is smaller if only supraventricular extrasystoles (SES) appear. It is much larger if ventricular extrasystoles (VES) appear. Moreover, immediate danger exists when the extrasystole appears in the final phase of the stimulation or if the source of stimulation of the ventricular extrasystole is changing in the myocardium. These last described extrasystoles are named polytope, multifocale or polymorph VES. They usually indicate the onset of fibrillation.

Ventricular extrasystoles differ in their shape from the normal QRS-portion and from supraventricular extrasystoles. Additionally, the shapes of the polytope VES differ from each other.

Heretofore, electronic appliances have been provided that automatically count appearing extrasystoles and release an alarm system when a certain frequency is registered. The disadvantage of these appliances is that they also count the less dangerous supraventricular extrasystoles and, as a result, release their alarm system more often than necessary.

Other appliances are known that count extrasystoles that appear only after a certain time limit from the QRS-portion. In these appliances the time limits are manually adjustable at the beginning of the observations to comply with the Q-T distances of the electrocardiograms. In this manner, the dangerous extrasystoles which appear in the T-wave portion, can be counted separately. The shortcoming with this type of apparatus is the adjustment of the time limit is related only to the QT-portion of the heart frequency during the time of adjustment. In case of a change of heartbeat frequency and short variations of the distances of the RR-interval, extrasystoles can be classified faultily as dangerous or, on the other hand, dangerous extrasystoles will not be counted.

Further appliances are known which differentiate ventricular extrasystoles from supraventricular extrasystoles and normal QRS-portions.

One of these appliances can measure the distance of each QRS-portion and investigate whether this distance differs more than 15 msec. from a registered QRA-portion taken at the beginning of the control. A QRS-portion larger than 15 msec is counted as a ventricular extrasystole. (Such an apparatus is described in U.S. Pat. No. 3,524,442.2.)

Another appliance of the type discussed above measures the area of each QRS-portion above the zero line and investigates whether this area differs by a limited value from the one given at the beginning of the observation. Those QRS-portions which are adequately enlarged are counted as ventricular extrasystoles.

These known appliances that distinguish ventricular extrasystoles from supraventricular extrasystoles and normal QRS-portions have a shortcoming in that the electronic means for examining the VES are insufficient in that the shape of the QRS-portion is determined by this equipment only in a rough manner. Therefore, those types of VES are not counted which only slightly differ in their shape from SES or normal heartbeats.

SUMMARY OF THE INVENTION

The present invention obviates the above-mentioned shortcomings by providing monitoring apparatus that is capable of automatically recognizing variations in electrocardiograms and thereby guaranteeing an accurate observation of heart-rhythm disturbances.

In its broadest aspect, the invention comprises logic means for recognizing wave shapes by determining and comparing the time position of threshold values of these waves. More particularly, the observed portions of the electrocardiogram digitalized, whereby a scanned section of the heartbeat interval actuates a number of flip-flops in work position and produces thereby a characteristic bit pattern which is compared with a previously stored bit pattern. In this manner, even minor pathological shape variations of the potential waves are automatically analyzed and signalized.

The features of the present invention which are believed to be novel are set forth with particularity in the appended Claims. The present invention, both as to its organization and manner of operation, together with the further advantages thereof, may best be understood by reference to the following description, taken in connection with the accompanying drawings.

BRIEF DESCRIPTION OF THE DRAWINGS

FIG. 3 is a diagram of the logic system utilized in the apparatus of the present invention;

FIG. 5 is a block diagram of the monitoring apparatus, in accordance with the present invention.

DESCRIPTION OF THE PREFERRED EMBODIMENT

Figure 1:
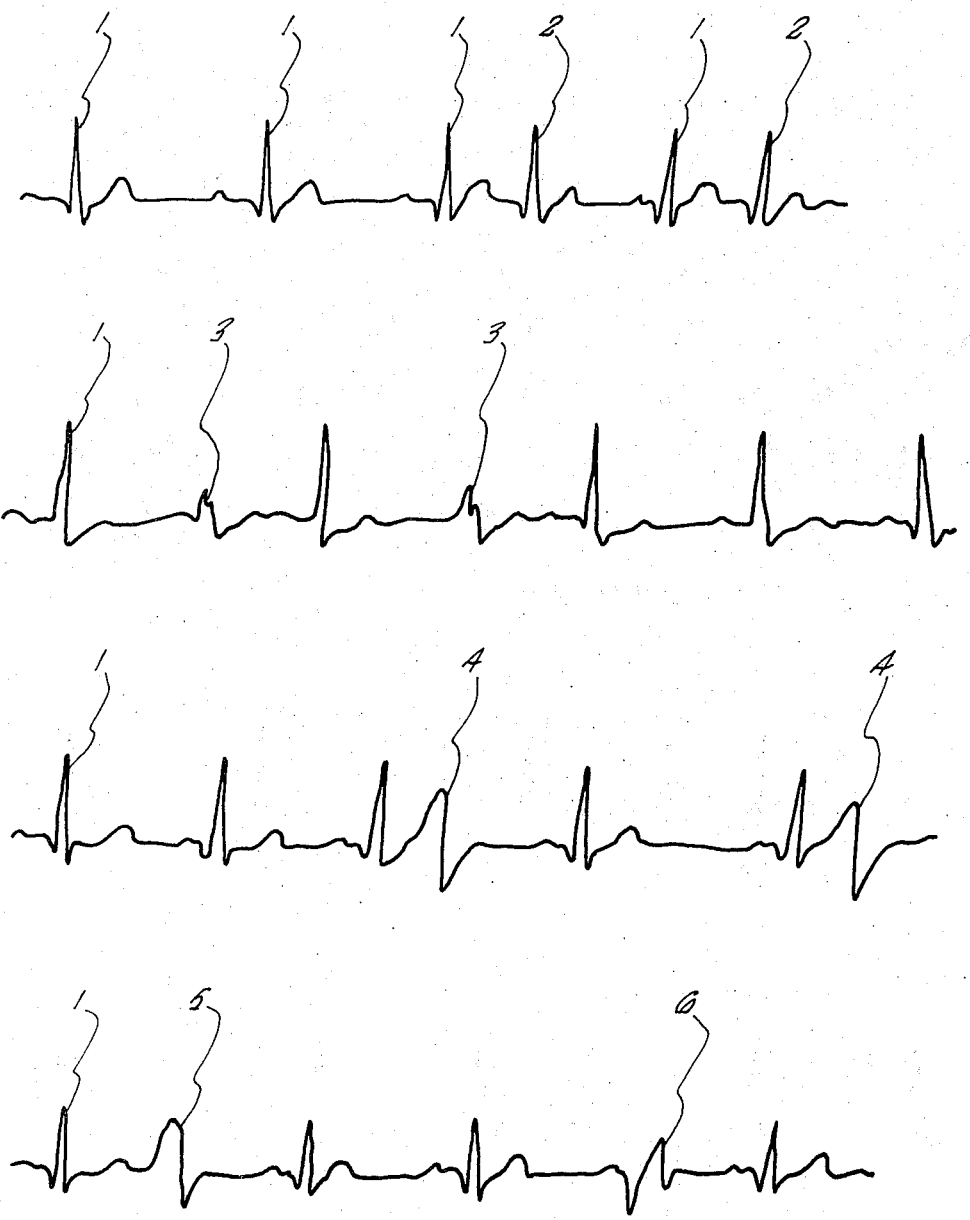
FIG. 1 is a view of four electrocardiograms illustrating normal QRS-portions along with different types of supraventricular and ventricular extrasystoles.

Referring now to the drawings, FIG. 1 illustrates an electrocardiogram with different types of extrasystoles. The waves indicated by the numeral 1 depict the regular heartbeat which will be hereinafter described as normal QRS-portions of the electrocardiogram. The waves indicated by numeral 2 depict supraventricular extrasystoles (SES) which appear after the regular QRS-portions 1. Various types of ventricular extrasystoles (VES) are also shown. The numeral 3 indicates ventricular extrasystoles which appear in the middle of two normal QRS-portions 1. The waves indicated by numeral 4 are ventricular extrasystoles which appear in the final phase of the stimulation. Numerals 5 and 6 indicate various polytope extrasystoles.

In accordance with the present invention, a monitoring apparatus, generally indicated by numeral 10, is provided which includes means for grading the time interval of the observed portion of the electrocardiogram into parts of equal latitudes. Means are then provided for transmitting two or more threshold values at the R wave of a basic QRS-portion 1 for comparision. These threshold values generate comparator signals which actuate a number of flip-flops in work position to produce a characteristic bit pattern in a number of stores in correlation to the coincidence of the comparator signals with a plurality of time bits. Corresponding bit patterns are then produced out of succeeding periods of the electrocardiogram and are compared to the previously stored basic bit pattern. Signal means are then provided which operate by non-identity of the compared bit patterns.

By considering the physiological fact that the normal ecg of a patient will not always be regular but will vary frequently (which not only includes variations of the RR intervals, i.e., respiratial arrhythmias, but variations in the QRS-portions), the QRS-portions of the observed patient are first recorded during a 20-second reference storage period along with all of the variations. The QRS-portions of the subsequently received ecg are then shifted into a second storage and then compared with the preselected ecg of the first storage. If the observed QRS-portion does not coincide with the QRS-portion of the pre-stored reference ecg, a logic analysis circuit will indicate a non-identity and a ventricular extrasystole (VES) will be recognized and registered. If, in a preadjustable time distance of a basic RR interval, a QRS-portion is recognized and is identical with a pre-stored reference QRS-portion, a supraventricular extrasystole (SES) is diagnosed.

Figure 2:
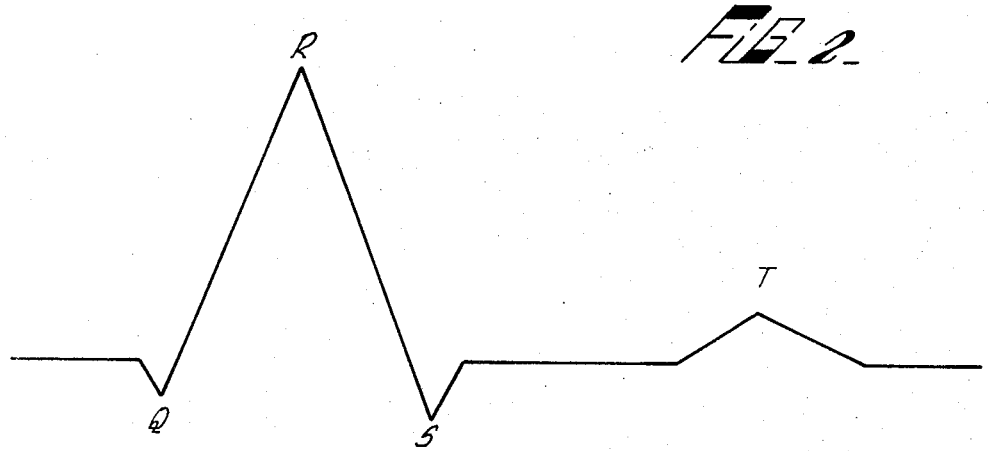
FIG. 2 is a diagram of a normal QRS wave form of a basic heartbeat.
Figure 2A:
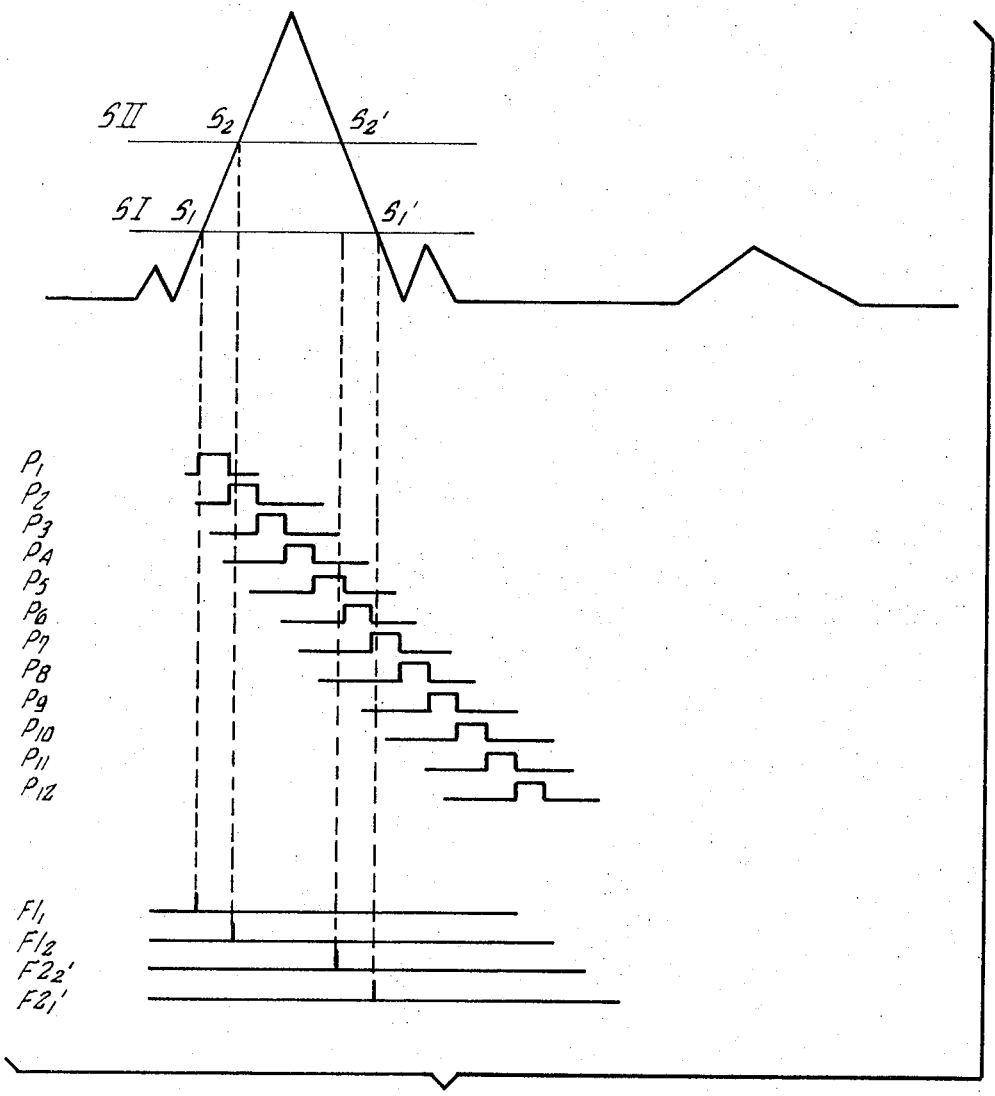
FIG. 2a illustrates a rectified QRS wave form of a basic heartbeat along with the temporal correlation of impulse time-windows utilized in the analysis and the obtained threshold impulses of the scanned portion of the wave form.

FIG. 2 illustrates normal values of a basic QRS-portion with a T-wave. FIG. 2a shows the same signal as that shown in FIG. 2 except that the Q and the S waves are rectified. Moreover, in FIG. 2, threshold levels SI and SII are introduced by means of voltage divider. Pulses (also referred to as time windows) $P_1$, $P_2$ ... $P_{12}$ are also introduced by two counters, described more fully hereinafter. These pulses of time windows are of equal amplitude and duration and occur the entire duration of the time interval corresponding to the analyzed part of the electrocardiogram.

In those moments when the received ecg signal crosses the levels of SI and SII, short positive pulses $S_1$, $S_2$, $S_2'$ and $S_1'$ are induced, as indicated by the lower portion of FIG. 2a. The pulse $S_1$ operates a counter, more fully described hereinafter, while the pulses $S_2$, $S_2'$ and $S_1'$ coincide with the characteristic time windows. In the example shown, the pulses $S_2$, $S_2'$ and $S_1'$ coincide with the time windows $P_2$, $P_5$ and $P_7$.

As shown in FIG. 3, the pulses $S_2$, $S_2'$ and $S_1'$ each feed one group of AND gates $U_2$ and the outputs from these AND gates $U_2$ supply assigned flip-flops of an intermediate storage $FF_2$. The second imputs of the AND gates $U_2$ are fed by the time window impulses $P_1$ ... $P_{12}$. As stated previously, the pulse $S_1$ actuates a linear counter $Z_1$, while the pulse $S_2'$ operates the linear counter $Z_2$.

If, for example, in the time window $P_2$, the pulse $S_2$ appears, the AND gate $U_2$ of that time window sets the corresponding flip-flop $b_1$ of the intermediate storage $FF_2$. $S_2'$ appears in the time window $P_5$ and the corresponding AND gate $U_2$ sets the flip-flop $g_1$. In a like manner, the pulse $S_1'$ actuates the particular AND gate $U_2$ of the third group which corresponds to the particular time window from the counter $Z_2$. The formation of the bit pattern $b$-$g$-$m$ is typical for the QRS-portion in FIG. 2a and is, therefore, stored in the intermediate storage $FF_2$.

It should be noted that a different QRS-portion will induce a different bit pattern and the comparison of both bit patterns will cause a non-identity and indicate a VES. To ensure that a small variation of the QRS-portion is not recorded as non-identical, the individual tolerance of the QRS-portion of the patient must be considered. This is accomplished by allowing the storage cycle to run for 20 seconds. In this manner, a representative profile of the irrelevant variations of the QRS-portion of the patient under observation is received and stored, and when these variations in the QRS-portion, recognized as irrelevant, appear during the subsequent observation of the patient, they are not diagnosed as pathological ventrical contractions. In order to ensure that the stored ecg is free from dangerous arrhythmias, it is necessary that a trained nurse or a doctor control the reference ecg. If extrasystoles do appear during the storage cycle, the storage cycle should be repeated until none appear.

Still referring to FIG. 3, the storage and reference elements consist of three groups $G_1$, $G_2$ and $G_3$ if, in accordance with the example, two threshold levels are used. If a larger number of thresholds is used, the sensitivity of the digitalization rises along with the number of storage and reference registers. In accordance with the example, the analysis is accomplished by group $G_1$ with pulse $S_2$, group $G_2$ with pulse $S_2'$, and group $G_3$ with pulse $S_1'$ to generate in its outputs time window pulses of equal latitude and amplitude (in the example, pulses $P_1$ ... $P_{12}$) in the same manner, the counter $Z_2$ is operated by pulse $S_2'$ to produce a limited number of time window pulses of equal latitude and amplitude (in the example pulses $P_1'$, $P_2'$, $P_3'$ and $P_4'$).

The corresponding control flip-flops of the intermediate storage $FF_2$ will be set to a positive position (log. "L") by the AND gates $U_2$ of group $G_1$, if the pulse $S_2$ coincides with one of the two time windows of group $G_1$, by the AND gates $U_2$ of group $G_2$ if the pulse $S_2'$ coincides with one of the time windows $P_1$ ... $P_{12}$, and by the AND gates $U_z$ of group $G_3$ if the pulse $S_1'$ coincides with one of the pulses $P_1' ... P_4'$.

During this 20-second storing cycle, the store input 22 is triggered by a store pulse and the information of the intermediate storage $FF_z$ is shifted via an AND gate $U_H$ to the main storage $FF_H$ which consists of flip-flops. The inputs of the AND gate $U_V$ are connected to the corresponding flip-flop outputs of the intermediate storage $FF_z$ and the main storage and the outputs of the AND gates $U_V$ are connected in groups to the outputs of the OR gates $O_d$.

The outputs of these three OR gates lead to an AND gate $U_J$ which is triggered by a control impulse $I_d$. The main storage $FF_H$, therefore, has stored at the end of the 20-second storage cycle in its flip-flops a characteristic bit pattern or compare pattern of the QRS-portion of the observed patient. In the following observation period, in each of the three groups $G_1$, $G_2$, $G_3$ of the compare circuit, in at least two corresponding flip-flops of the intermediate storage $FF_z$ and main storage $FF_H$ are identical, the AND gate $U_V$ will be set on the binary code log. "L," i.e., that the outputs of all three OR gates $O_d$ are set on log. "L." After each analyzed QRS-portion, a control impulse $I_d$ registers that the condition at the input of the AND gate $U_J$ is satisfied so that the output $U_J$ is supplied with a positive pulse J which confirms an equality of one of the previously stored QRS-portions and the QRS-portion of the observation cycle. If, in one or more of the three groups, an equality of the corresponding flip-flops in the intermediate storage $FF_z$ and main storage $FF_H$ is not found, at least one OR gate will not be set by a positive pulse on log. "L," and at least one input of the AND gate $U_J$ stays on log. "0." Therefore, the output is on log. "O." An inverter 23 is inserted between the AND gate $U_J$ and the AND gete $U_{NJ}$, and the AND gate $U_{NJ}$ is set during the $J_d$ pulse. The positive pulse NJ, commanded by the AND gate $U_{NJ}$, will then signalize a ventricular extrasystole VES.

An automatic reset pulser $V_z$ will command the intermediate storage $FF_z$ to be cleared from the information after each recognized and compared QRS-portion between the intermediate storage $FF_z$ and the main storage $FF_H$, so that the intermediate storage $FF_z$ is free for a new QRS-portion detection. The reset pulser $V_H$, which puts the main storage $FF_H$ into the standby position, will be induced only in the beginning of a new storage cycle.

The variations of the whole QRS-portions are recorded in a storage cycle in the main storage $FF_H$ and at least in groups $G_2$ and $G_3$, a number of flip-flops are always set. For the continuous QRS-comparison it is sufficient that in each group at least one flip-flop in the main storage $FF_H$ is in coincidence with a corresponding flip-flop in the intermediate storage $FF_z$, in order to classify a received QRS-portion as normal for the observed patient. If, in one or more groups, an identity does not exist between the corresponding flip-flops in the intermediate storate $FF_z$ and the main storage $FF_H$, a ventricular extrasystole will be signalized.

For the examination of polytope VES, additional equipment is provided. A VES store indicated by numeral 20 in FIG. 5 with the same bit capacity as the intermediate storage $FF_z$ in FIG. 3, a takeover logic and a compare logic all consisting of AND gates, again similar to that shown in FIG. 3. The takeover logic operated by the pulse NJ of the AND gate NJ shifts the last analyzed VES pattern out of the intermediate storage $FF_z$ into the VES storage 20 analogous to the storing in the main storage $FF_H$. Parallel to the recognition of a new VES in the intermediate storage $FF_z$, the compare logic also examines in a manner similar to the AND gate $U_V$ in FIG. 3 the previous VES in the VES store 20 with the new VES in the intermediate storage $FF_z$. If both VES bit patterns, in the intermediate storage $FF_z$ and the VES storage 20 are proved as identical, only a VES will be signalized. In case of non-identity, a polytope VES will be signalized. After each VES identification, the previous VES in the VES storage 20 will be eliminated and the last VES commanded from the intermediate storage $FF_z$ will be put into the VES store so that only the last VES is used as reference for the following VES comparsion.

Ventricular extrasystoles with equal origin of stimulation can exhibit different shapes in the ecg so that even monotope VES could be interpreted falsely as polytope VES. To protect against this faulty analysis, the width of the pulse tolerance is increased by increasing the pulse duration of the pulses $S_2$, $S_2'$ and $S_1'$ about 50 percent of the pulse duration of the time windows $P_1 ... P_{12}$. Thus it is ensured that a pulse appearing in the external zone of two time windows is not only in one but in both windows recognized and, therefore, those two corresponding flip-flops are operated.

Figure 4:
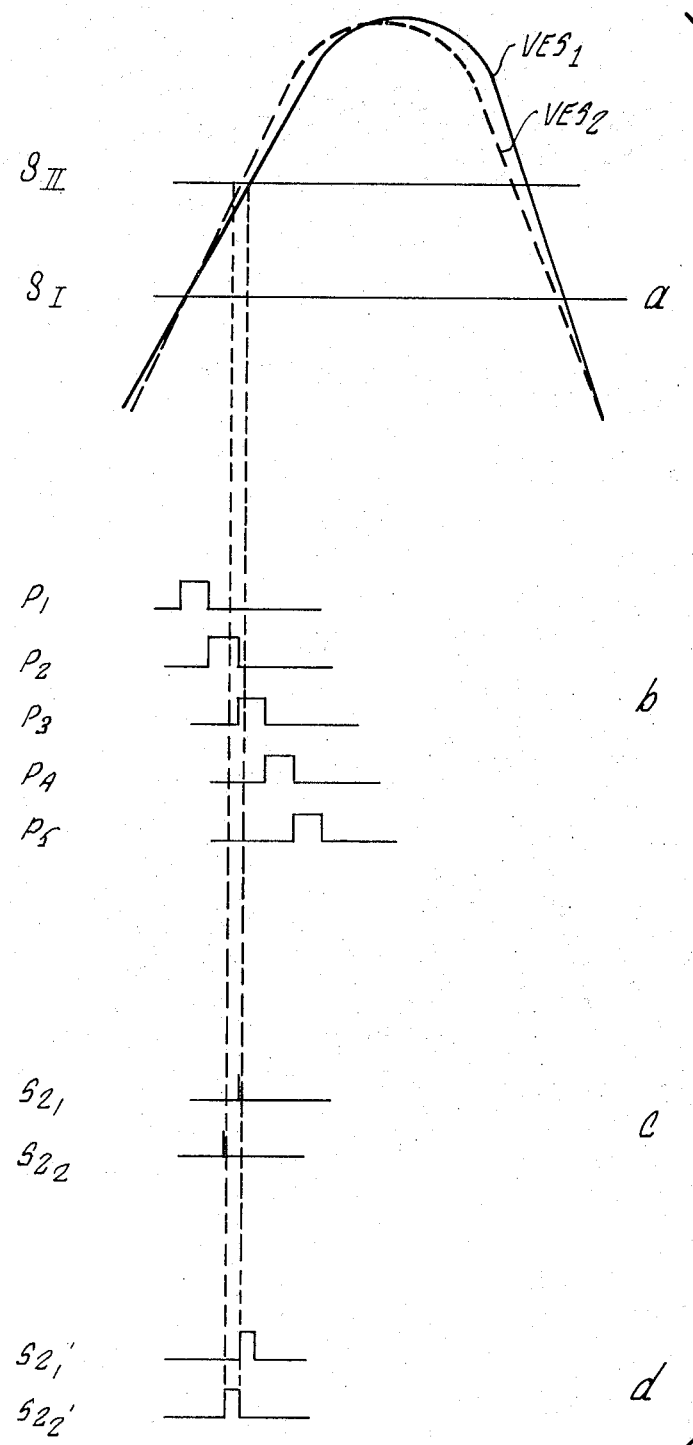
FIG. 4 is a schematic view showing a different manner of obtaining analysis impulses.

This action is described in FIG. 4. In the FIGURE are shown two VES with the same stimulation center (monotope) $VES_1$ and $VES_2$ (for simplification, $VES_1$ is drawn on $VES_2$) with only small variations in the ecg wave shape. FIG. 4 also shows the corresponding time windows and the pulses $S_{21}$ and $S_{22}$ induced by $VES_1$ and $VES_2$, whereby the pulses are much shorter than the pulses $P_1$, $P_2$, $P_3$ etc. FIG. 4 also shows the same pulses with an enlarged pulse duration of the pulses $S_{21}'$ and $S_{22}'$. For simplification the analysis is explained only by passing the threshold $S_2$, $VES_1$ induces the pulse $S_{21}$ which coincides with pulse $P_3$. $VES_2$ induces pulse $S_{22}$ but appears together (in phase) with pulse $P_2$, so that two different store flip-flops would be set and the logic would analyze a polytope. If those pulses are used according to the bottom of FIG. 4, pulse $S_{21}'$ will appear as above in pulse $P_3$, while pulse $S_{22}'$ is present in pulse $P_2$ and $P_3$. The equal position of operation of the corresponding flip-flops of pulse $P_3$ in the intermediate storage $FF_z$ and in the VES store 20 will analyze both VES as monotope as to the threshold pulse $S_2$. According to the above, the same operation is used for little variations of normal QRS-portions.

FIG. 5 illustrates a block diagram of the monitoring apparatus 10. In the described embodiment, the received ecg of the patient is fed into an input 11 and then amplified by amplifier 12 which includes a low pass filter. A suppressor 13 is provided to suppress the zero-line fluctuation. The amplified signal is rectified and increased in its amplitude up to a standard value in an automatic amplifier 14. From this amplitude, two or more threshold values are derived by a voltage divider 15. In the present embodiment, the two threshold values are provided with their amplitude being 30 percent and 60 percent, respectively, of the medium R-wave amplitude. The linear counters $Z_1$ and $Z_2$ (FIG. 3) are part of the analog digital transducer 16. Moreover, two comparators, equipped with differential stages, form part of the A D transducer 16. The groups of AND gates $U_Z$ belong to the takeover logic 18. The AND gates $U_v$ and the OR gates $O_d$ are part of the reference logic 21.

An electronic counter releases an alarm system 27 and 29 as soon as a predetermined frequency of VES or SES is exceeded. The limit rate can be chosen by the doctor. The device is also able to recognize and signal consecutive VES or SES not interrupted by a basic heartbeat as VES or SES salvos and to release the alarm systems 28 and 30.

Polytope is recognized by at first transferring detected VES fed to a separate storage. The later identified VES is compared with this previously stored VES. If those two VES are different, a polytope VES is recognized. Afterwards, the old VES will be replaced by the new VES in the polytopic store. Thus the last VES is now the reference base for the polytope indication. This analysis is carried out in the VES analyzer 24, with the alarm unit 26 provided to signal the existence of polytope VES. For detecting a VES on the T-wave the known function of the QT-duration and the R-R-distance ($\overline{QT} = f(\overline{RR})$) from the foregoing R-R-interval is used. The QT-duration is derived from each preceding R-R-distance, and herein during the interval of the T-wave, a time window operates at about 200 ms. Exclusively during these 200 ms an analysis circuit is activated to indicate gradient and amplitude of a normal (reference) T-wave. If another T-wave differs by a certain value in the gradient and/or amplitude from this reference, a VES on the T-wave (R on T phenomenon) is alarmed. These components are illustrated on the lower portion of FIG. 5, part of which are indicated by numerals 31, 32 and 33.

As can be seen, these different accoustical and optical alarm systems shown in FIG. 5 permit the doctor to initiate necessary therapy measures to reinstall the basic heart rhythm of the patient.

It should be noted that various modifications can be made to the apparatus while still remaining within the purview of the following claims.

What is claimed is:

1. Apparatus for monitoring electrocardiograph signals comprising:
    means for scanning wave sections of the heartbeat cycles of the ecg signals;
    means for establishing at least one threshold potential level on the ecg signals;
    means for producing pulses corresponding to the moments each scanned wave crosses each threshold level;
    means for establishing a sequence of time windows occurring during the scanning period;
    means for electrically identifying the respective time windows in which each induced pulse occurs over several normal heartbeat cycles to provide reference bit patterns;
    means for storing said normal bit patterns;
    means for electrically recording the time windows in which induced pulses from subsequent heartbeat cycles occur to provide an observed bit pattern;
    means for comparing said observed bit pattern with said reference bit patterns; and
    means for energizing an output circuit in response to any departures of each observed bit pattern from said stored bit patterns.

2. The combination of claim 1 wherein said means for establishing a sequence of time windows comprises at least one linear counter responsive to the initial induced pulse for generating tach pulses of equal amplitude and duration.

3. The combination of claim 2 wherein said means for identifying the respective time windows in which each induced pulse occurs comprises:
    a plurality of AND gates responsive to induced pulses and said tach pulses; and
    a plurality of flip-flop circuits for receiving the outputs of said respective AND gates and delivering a plurality of output pulses in response thereto.

4. The combination of claim 3 wherein said storage means comprises:
    a second plurality of AND gates responsive to the output pulses of said flip-flop circuits; and
    a second plurality of storage flip-flop circuits for receiving the outputs of said second plurality of AND gates and for delivering a plurality of output pulses in response thereto.

5. The combination of claim 4 wherein said comparing means comprises a third plurality of AND gates responsive to the output pulses of said first and second plurality of flip-flop circuits.

6. The combination of claim 5 wherein said means for energizing an output circuit comprises:
    a plurality of OR gates responsive to the output of said third plurality of AND gates;
    a fourth AND gate responsive to the outputs of said OR gates; and
    means for producing an output command responsive to said fourth AND gate.

7. The combination of claim 1 wherein said means for establishing at least one threshold potential comprises an analog-digital transducer.

8. The combination of claim 1 further comprising:
    means for storing the observed bit pattern that is a recognized non-identity with the reference bit pattern; and
    means for comparing the bit pattern of the stored, observed bit pattern with a bit pattern of the following non-identity observed bit pattern to identify the non-identity of these bit patterns as a polytope ventricular extrasystole.

9. The combination of claim 7 further including means on said analog-digital-transducer for enlarging the duration of said induced pulses to enable the pulses to be received in the adjoining time windows so that natural variations of normal wave sections will not be interpreted faultily.

* * * * *